United States Patent

[11] 3,604,453

| [72] | Inventor | Boyd Boitnott |
| | | Houston, Tex. |
| [21] | Appl. No. | 869,160 |
| [22] | Filed | Oct. 24, 1969 |
| [45] | Patented | Sept. 14, 1971 |
| [73] | Assignee | Gray Tool Company |
| | | Houston, Tex. |

[54] CHECK VALVE
9 Claims, 5 Drawing Figs.

[52] U.S. Cl. ........................................................ 137/527
[51] Int. Cl. ........................................................ F16k 15/03
[50] Field of Search............................................ 137/521,
527, 527.8; 251/303

[56] References Cited
UNITED STATES PATENTS
3,016,914 1/1962 Keithahn ..................... 137/527 X Primary Examiner—Robert G. Nilson
Attorney—Cushman, Darby & Cushman ABSTRACT: A radially directed annular shoulder in the housing through passageway seats a flapper having opposed trunnions nearer one edge. The trunnions are received in a circumferential groove which is axially longer than the thickness of the trunnions to allow movement of the trunnions away from the seat. A spring received in the groove mounts the flapper; another urges the trunnions toward the seat and presses the flapper toward the seat. The flapper is thus free to move angularly of the housing to even out seat wear. The cross-sectional area of the housing passageway at the immediately downstream of the flapper trunnions remains circular, but is larger in area to accommodate the fluid flow plus the volume of the flapper when the valve is open. As flow is directed against the flapper from the upstream side, the second spring compresses and the flapper moves off the seat. At the same time, the flow tends to rotate the flapper about the axis of the trunnions which are acting against the springs. When fully open, only a small portion of the edge of the flapper is exposed to the flowing media; hence, a low pressure drop is experienced.

INVENTOR
BOYD BOITNOTT

INVENTOR
BOYD BOITNOTT

BY
Cushman, Darby & Cushman
ATTORNEYS

3,604,453

CHECK VALVE

BACKGROUND AND SUMMARY OF THE INVENTION

In order to overcome certain drawbacks of presently available check valves, the valve of the present invention is full opening within a round, rather than T-shaped, chamber; has no spatial orientation limitation; is of simple construction; provides laminar flow through; has spring-energized flapper seating; is silent and smooth in operation; is easy to install, compact, light in weight and relatively economical.

The valve of the present invention is an improvement upon the design shown in the commonly assigned U.S. Pat. application of Latham and Holbert, Jr., Ser. No. 686,434, filed Nov. 29, 1967, now U.S. Pat. No. 3,509,908 issued May 5, 1970. Another prior art construction is depicted in the U.S. Pat. of Hagner, No. 3,276,471.

The check valve of the invention includes a housing having a through bore or passageway. A radially directed annular shoulder in the housing through passageway seats a flapper having opposed trunnions nearer one edge. The trunnions are received in a circumferential groove which is axially longer than the thickness of the trunnions to allow movement of the trunnions away from the seat. Springs received in the groove urge the trunnions toward the seat and press the flapper toward the seat. The flapper is thus free to move angularly of the housing to even out seat wear. This feature also makes assembly of the valve easier. The cross-sectional area of the housing passageway at the immediately downstream of the flapper trunnions remains circular, but is larger in area to accommodate the fluid flow plus the volume of the flapper when the valve is open. As flow is directed against the flapper from the upstream side, the springs compress and the flapper moves off the seat. At the same time, the flow tends to rotate the flapper about the axis of the trunnions which are acting against the springs. When fully open, only a small portion of the edge of the flapper is exposed to the flowing media; hence, a low pressure drop is experienced.

The principles of the invention will be further hereinafter discussed with reference to the drawings wherein preferred embodiments are shown. The specifics illustrated in the drawings are intended to exemplify rather than limit aspects of the invention as defined in the claims.

DESCRIPTION OF THE PREFERRED EMBODIMENTS

Figure 1:
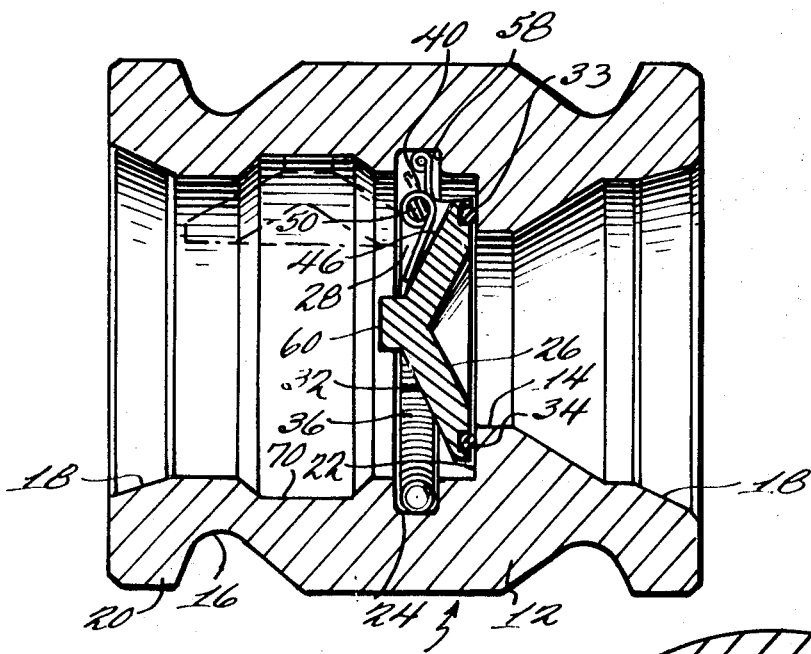
FIG. 1 is a longitudinal sectional view of the new check valve.
Figure 2:
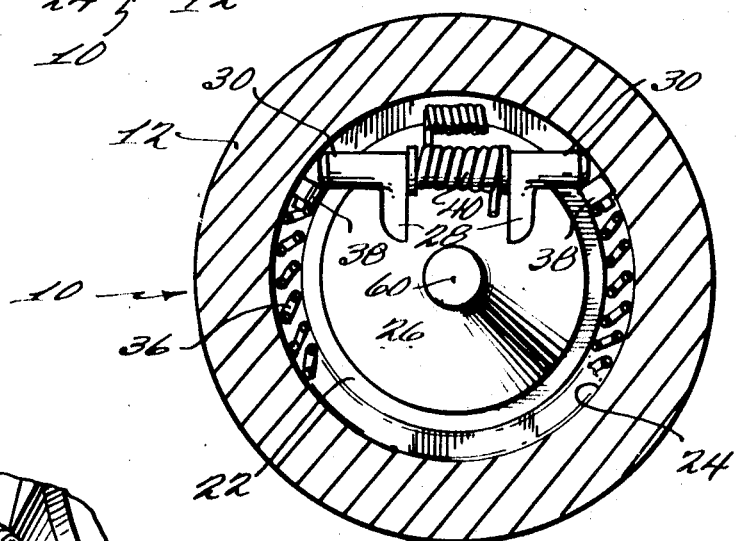
FIG. 2 is a transverse sectional view of the new check valve looking upstream from just downstream of the flapper.
Figure 3:
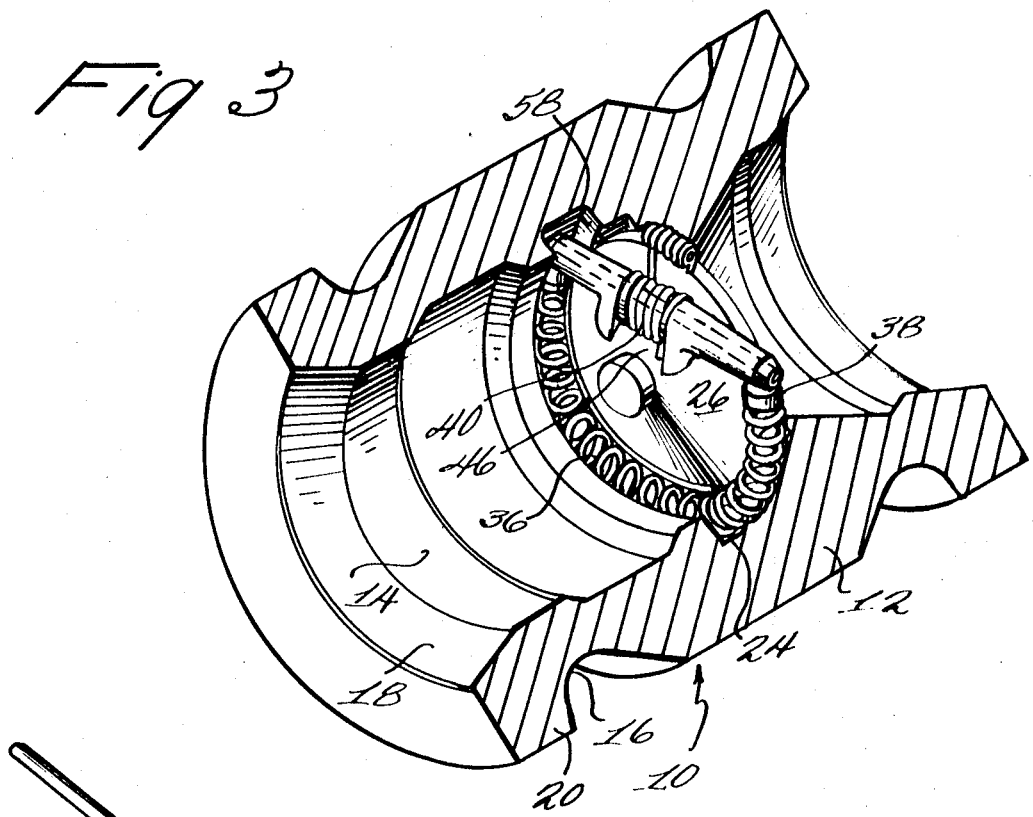
FIG. 3 is a longitudinal sectional view of the new check valve in perspective from the downstream side.
Figure 5:
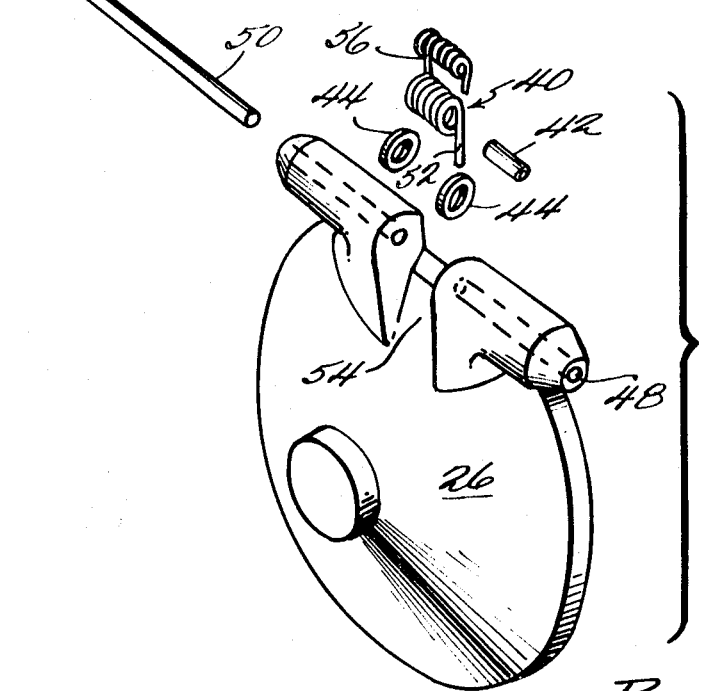
FIG. 5 is an exploded perspective view of the flapper assembly for the valves of FIGS. 1-4.

A presently preferred embodiment of the valve is shown at 10 in FIGS. 1-3. Referring to these figures, the value 10 includes a one piece tubular housing or body 12 having a cylindrical bore 14 providing the chamber of the housing. At its opposite ends, the housing 12 is provided with necks 16, internal sealing ring seat surfaces 18, and receiving flanges 20 for contractile-expansible clamps. Suitable sealing rings and clamps are discussed in the aforementioned patent application of Latham et al. in respect to FIG. 7 thereon. Although these seals and connectors are preferred, others of different design could be used.

The bore 14 undergoes a sharp radial enlargement intermediate the length thereof defining an annular, axially downstream-facing shoulder 22, coaxial with the bore. Downstream of the valve seat shoulder 22 a circumferential groove 24 is formed in the valve body 12, opening radially inwardly through its circumferential extent into the bore 14.

The flapper or valve disk 26 of the valve 10 is generally circular in plan and has two laterally spaced, parallel ears 28 protruding from the rear thereof. Opposed trunnions 30 oppositely outwardly extend from the ears 28 in axial alignment parallel to a diameter of the disk. The trunnions 30 are approximately tangent to the rear face 32 of the disk 26.

A circumferential groove 33 formed in the upstream outer peripheral region of the disk 26 receives a protruding resilient seal ring 34. Of course, the groove and seal may alternatively be provided in the seat 22 or the upstream face of the valve disk may be lapped to provide a metal-to-metal seal with the valve seat 22.

The axial length of the circumferential groove 24 is sufficient to permit movement of the flapper trunnions 30 axially of the seat 22, preventing wear to the seat and flapper seal 34 during opening and closing cycles.

A compression spring 36 of sufficient length to fill the circumferential groove 24 angularly between the two trunnions proceeding the long way around, prevents the flapper trunnions 30 from moving out of the groove 24, firmly capturing flapper 26. Wear buttons 38, made of low-friction material such as Teflon polytetrafluoroethylene, may be provided at each end of the compression spring 36 between the ends of the spring and the flapper trunnions to aid in longer flapper life and reduce friction in operation.

A coiled torsion 40, prestressed during assembly, urges the flapper 26 and seal 34 to maintain contact with seat 22. The torsion spring 40 is assembled over a tubular bushing 42 and between wear washers 44. The torsion spring 40 is placed in an angled notch 46 between the flapper trunnions. A bore 48, disposed axially through the flapper trunnions, accepts a retaining pin 50 which, in turn, passing through the center of the coils of the torsion spring 40, through the bushing 42 and washers 44, constitutes the flapper assembly and also provides a pivot axis for the flapper assembly.

When properly installed in the valve body 10, the flapper trunnions 30 nest in the circumferential groove 24, one leg 52 of the torsion spring 40 bears against the angled floor 54 surface in the notch 46 between the trunnions and the other leg 56 of torsion spring 40 bears against the edge 58 of circumferential groove 24 nearest to and in the direction of seat shoulder 22. Although this is a preferred arrangement, the torsion spring legs could be designed to get their purchase elsewhere. For instance, the leg 52 could be received in a suitable socket formed in the flapper and the leg 56 could be received in a suitable socket formed in the valve housing through bore.

A bumper boss 60 formed generally axially centrally on the downstream side of the flapper disc provides a stop, preventing the flapper from rotating in excess of a predetermined angle, in the present instance 90°.

Because the circumferential groove 24 is continuous, the flapper and compression spring 36 may be placed in an infinite variety of positions angularly of the valve body relative to the seat, and are free to move circumferentially about the groove during operation, distributing minor seal and seat wear evenly and prolonging valve life.

Figure 4:
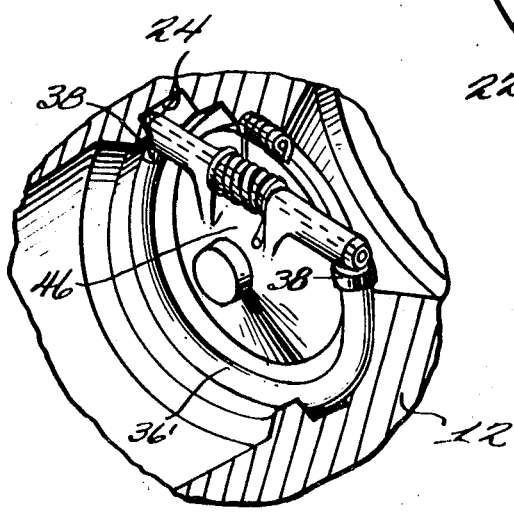
FIG. 4 is a fragmentary longitudinal sectional view, similar to the full sectional view in FIg. 3, but of a modified form using a snap ring in place of a coil spring for maintaining the flapper trunnions seated in the valve body circumferential groove.

FIG. 4 depicts a variation wherein a solid C-shaped rod 36' in the nature of a resilient snap ring, curved to fit the circumferential groove, is used in place of the coiled compression spring 36 illustrated in FIGS. 1-3.

the overall length of the trunnions from the outer end of one to the outer end of the other is in the range between slightly less than the length of a diameter of the valve body through bore just downstream of the valve seat and the length of said diameter plus slightly less than one radial depth of said circumferential groove. When at the lower end of said range, installation involves inserting the flapper assembly into the body from the downstream end with the flapper lying substantially on any longitudinal center line plane of the body through bore, bringing the flapper to a point where its trunnions lie radially adjacent the circumferential groove 24, cocking the spring 40 and moving the flapper laterally until both trunnions bottom in the groove 24. Then the spring 36 or snap ring 36' with its wear buttons 38 is emplaced to retain the flapper as shown in the drawings. If the trunnions are longer than a diameter of the body through bore, the above procedure is followed, excepting that the flapper must be canted somewhat during insertion so that first one trunnion, then the other, become disposed in the circumferential groove 24.

In any event, the length of the trunnions is such that when the trunnion ends are both bottomed in the circumferential grove, the flapper, when closed, is centered on the valve seat.

Downstream from the groove 24, the valve body through bore is circumferentially enlarged to provide a recess 70 into which the flapper is accepted as the valve opens. The bumper boss 60 of the flapper bottoms in the recess 70 to limit angular opening movement of the flapper.

The compression spring may receive a stiffener through the center of its coil in the form of a split hoop of wire, should the user be apprehensive of buckling of the spring 36 distally of the ends thereof.

The spring 36 or ring 36' maintains the trunnions bottomed in the circumferential groove 24; the torsion spring biases the flapper against the valve seat; the disparity between the thickness of the trunnions and the axial length of the circumferential groove permits the valve flapper to move axially off its seat while opening.

The valve 10 advantages include and improve upon those of the valves of the aforementioned Latham et al. patent application and since the valve 10 has few parts and no external parts for possible leakage, it is completely disassemblable in the field using simple tools and, through inexpensive, it is suitable for high pressure use.

It should now be apparent that the check valve as described hereinabove possesses each of the attributes set forth in the specification under the heading "Background and Summary of the Invention" hereinbefore. Because the check valve of the invention can be modified to some extent without departing from the principles of the invention as they have been outlined and explained in this specification, the present invention should be understood as encompassing all such modifications as are within the spirit and scope of the following claims.

1. A valve including: a housing having a longitudinal through passageway, said passageway having means defining a chamber therein intermediate the ends thereof, said chamber being delimited at one end by a radially directed annular shoulder defining a circumferential valve seat; a valve disk having two aligned trunnions thereon laterally offset from a diameter of the disk; recess means defined in said housing adjacent said seat downstream thereof, said recess means including a circumferential groove opening into said through passageway, said groove being longer axially of the through passageway then the diameter of said trunnions are thick; said trunnions being received in said groove; torsion spring means mounted in said housing, said torsion spring means including at least one leg disposed to bear against said disk in such sense as to urge said disk toward said seat, at least another leg disposed against said housing, and a curved portion intermediate said one leg and said other leg; a retainer resiliently, removably received in said groove proceeding the long way around therein between the outer ends of said trunnions and having opposite ends thereof maintaining the outer ends of said trunnions in bottoming relationship in said groove; means between said retainer ring and torsion spring for maintaining said torsion spring other leg in position to bear against said housing; said torsion spring means resiliently pressing said disk against said seat, whereby upstream fluid flowing against said disk moves said disk downstream and rotates said disk about said trunnions against restoring force provided by said torsion spring means.

2. The valve of claim 1 wherein said retainer is a coil spring under compression in said groove.

3. The valve of claim 1 wherein said retainer is a C-shaped snap ring.

4. The valve of claim 1 wherein said trunnions both have means defining axially directed openings therein; and wherein said force transmitting means comprises a rod received in said openings and extending between said trunnions; said torsion spring curved portion being at least one spring coil; said rod extending through said at least one spring coil.

5. The valve of claim 4 wherein said torsion spring other leg is received in said groove for gaining purchase against said housing.

6. The valve of claim 1 wherein said trunnions, from outer end to outer end, extend over a length about equal to a diameter of said housing through passageway adjacent said groove therein.

7. The valve of claim 1 including bearing means of antifriction material interposed between each end of the retainer and each trunnion.

8. The valve of claim 1 further including means defining a stop boss on the downstream face of said valve disk; and means defining a circumferential recess in said housing through passageway downstream of said groove, located for receipt of said valve disk upon opening thereof regardless of orientation of the valve disk, angularly with respect to the longitudinal axis of the body; said stop boss being arranged to bottom in said recess for limiting opening of said valve.

9. A valve including: a housing having a longitudinal through passageway, said passageway having means defining a chamber therein intermediate the ends thereof, said chamber being delimited at one end by a radially directed annular shoulder defining a circumferential valve seat; a valve disk having two aligned trunnions thereon laterally offset from a diameter of the disk; recess means defined in said housing adjacent said seat downstream thereof, said recess means including a circumferential groove opening into said through passageway, said groove being longer axially of the through passageway than the diameter of said trunnions is thick; said trunnions being received in said groove; said trunnions, from outer end to outer end, extending over a length about equal to a diameter of said housing through passageway adjacent said groove; torsion spring means mounted in said housing, said torsion spring means including at least one leg disposed to bear against said disk in such sense as to urge said disk toward said seat, at least another leg disposed against said housing, and a curved portion intermediate said one leg and said other leg; retainer means, removably received in said groove proceeding the long way around therein between the outer ends of said trunnions and having opposite ends thereof engaging the outer ends of said trunnions to maintain them in said groove; rod means received through the curved portion of the torsion spring for transmitting retaining force for maintaining the torsion spring other leg in position to bear against said housing; said torsion spring means resiliently pressing said disk against said seat, whereby upstream fluid flowing against said disk rotates said disk about said trunnions against restoring force provided by said torsion spring means.